United States Patent [19]

Schatz

[11] Patent Number: 5,038,734
[45] Date of Patent: Aug. 13, 1991

[54] METHOD FOR THE OPERATION OF AN IC ENGINE AND AN IC ENGINE FOR PERFORMING THE METHOD

[76] Inventor: Oskar Schatz, Waldpromenade 16, 8035 Gauting, Fed. Rep. of Germany

[21] Appl. No.: 549,536

[22] Filed: Jul. 9, 1990

Related U.S. Application Data

[63] Continuation of Ser. No. 267,172, Nov. 4, 1988, abandoned.

[51] Int. Cl.⁵ .................................................. F02D 9/00
[52] U.S. Cl. ............................. 123/403; 123/52 MF; 123/559.1
[58] Field of Search ............... 123/403, 52 MF, 198 F, 123/559.1, 389, 336

[56] References Cited

U.S. PATENT DOCUMENTS

| | | | |
|---|---|---|---|
| 2,337,982 | 12/1943 | Ericson | 123/52 MF |
| 3,167,059 | 1/1965 | Love | 123/52 MF |
| 3,935,842 | 2/1976 | Ishizawa et al. | 123/52 MF |
| 4,153,018 | 5/1979 | Kimata et al. | 123/389 |
| 4,445,336 | 5/1984 | Inoue | 123/559.1 |
| 4,484,556 | 11/1984 | Okimoto et al. | 123/559.1 |
| 4,519,369 | 5/1985 | Kitamura | 123/403 |
| 4,557,241 | 12/1985 | Kawachi et al. | 123/559.1 |
| 4,709,682 | 12/1987 | Kato | 123/559.1 |

*Primary Examiner*—Andrew M. Dolinar
*Assistant Examiner*—M. Macy
*Attorney, Agent, or Firm*—Harness, Dickey & Pierce

[57] ABSTRACT

In an IC engine of the piston type a control valve (22) is arranged upstream from the engine inlet valve (16) in the inlet duct (14). This control valve is in the form of a directional valve with an adjustable opening threshold and preferably in the form of a check flap (26) closing in a direction opposite to the flow direction, whose release force may be adjusted and which is opened in accordance with the selected operational parameters of the IC engine and with a freely set retardation in relation to the engine inlet valve (16).

13 Claims, 1 Drawing Sheet

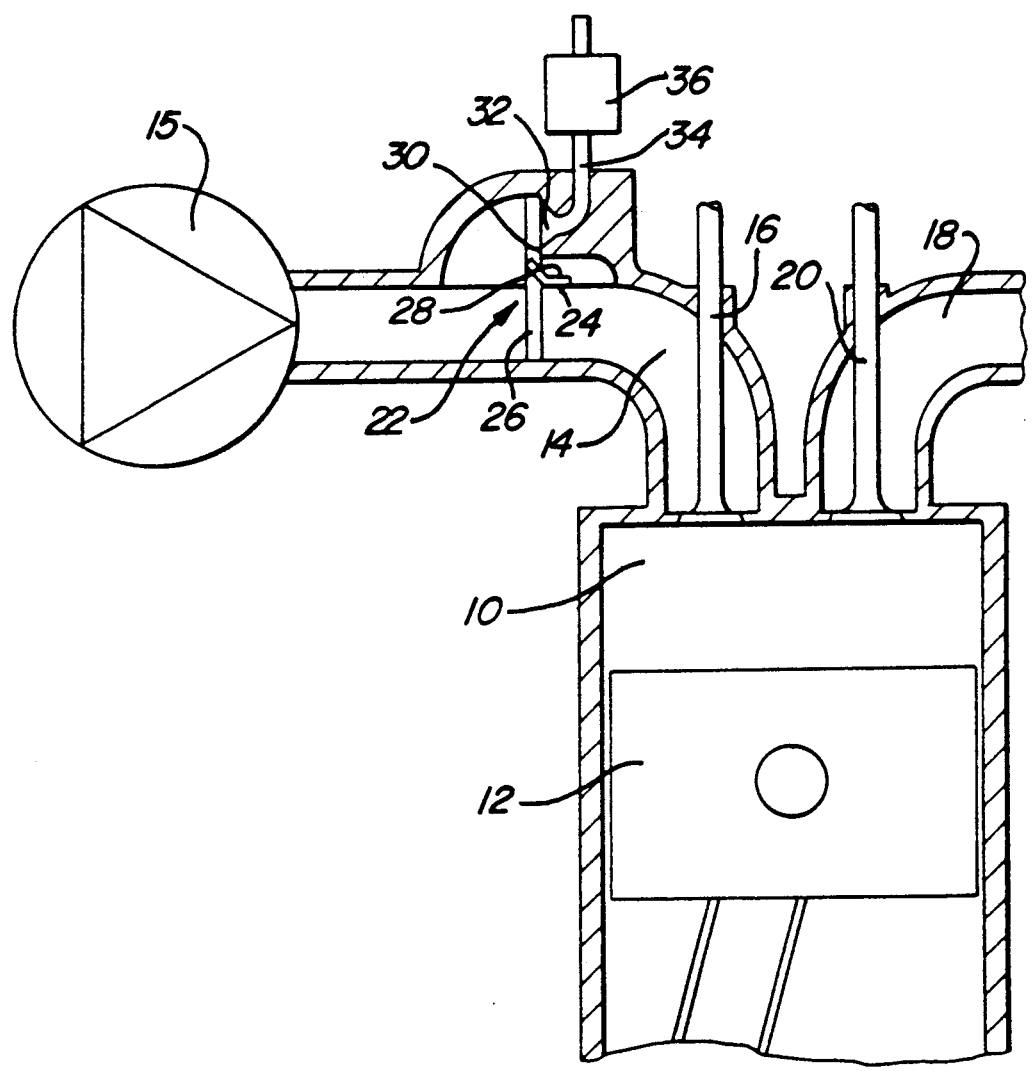

METHOD FOR THE OPERATION OF AN IC ENGINE AND AN IC ENGINE FOR PERFORMING THE METHOD

This is continuation of U.S. patent application Ser. No. 07/267,172, filed Nov. 4, 1988, now abandoned.

The invention relates to a method for the operation of an IC engine of the piston type with an inlet duct connecting a charger with at least one combustion chamber of the engine and at least one inlet valve placed between the inlet duct and each combustion chamber, and to an IC engine for performing the method.

The charging of IC engines has the aim of introducing precompressed charge into the combustion chamber of the engine. In this respect the engine piston is acted upon by the charging pressure during its travel from the upper to the lower dead center positions and thus takes energy from the compressed charge, such energy having to be supplied by the charger as expulsion energy. This expulsion work is equal to many times the simple compression work, for which reason the drive power for the charger has to be many times greater than the power needed for performing the simple compression work.

The object of the invention is to substantially reduce the release of work from the compressed charge to the engine piston.

In order to achieve this in the above mentioned method there is a control valve placed upstream from the inlet valve and such control valve is opened in response to selected operational parameters of the engine with a freely selected retardation in relation to the time of opening.

Since the engine piston will have already moved along part of its path from the upper to the lower dead center position when the charge flows with the selected retardation into the combustion chamber, less work is released by the charge to the engine piston. The intended effect of the invention is mainly produced at low speeds of rotation. The drive power saved in this manner for the charger may be used in order to produce a higher torque at low speeds of rotation without this being at the sacrifice of torque at higher speeds of rotation. Furthermore, the method in accordance with the invention makes it possible to improve the load acceptance of the engine, since for instance under partial load conditions the control valve is opened generally at the same time as the inlet valve and when there is an increase in load a higher torque immediately becomes available owing to the retarded opening of the control valve.

When the inlet valve is opened, while the control valve is still shut, there is initially an expansion of the charge, which is located between the inlet valve and the cylinder control valve and is under pressure, into the combustion chamber. If the control valve is opened at a suitably late point in time a vacuum will be produced in the combustion chamber so that the pressure in the combustion chamber at the start of the flow thereinto of the compressed charge will be substantially lower than the pressure in the case of conventional charging of an engine. This however not only means that less energy is released from the compressed charge to the engine piston but also owing to difference, present at the retarded opening of the control valve, and dependent on the amount of retardation, upstream and downstream from the control valve, a correspondingly high flow velocity is caused of the charge flowing into the combustion chamber. This flow velocity is reduced towards the end of the piston stroke, this leading in a manner typical for induction engines to a dynamic pressure increase, even prior to the closing of the inlet valve.

In order to preclude this increase in pressure leading to a return flow of the charge out of the combustion chamber there is a useful further feature of the invention in accordance with which the control valve is automatically closed as soon as the pressures upstream and downstream form the control valve have sunk to a predetermined pressure difference.

A further object of the invention is to provide an IC engine suitable for performing the method. In order to attain this aim a charged IC engine of the piston type having an inlet duct connecting a charger with at least one combustion chamber and at least one inlet valve placed between the inlet duct and each combustion chamber is so designed that upstream from the inlet valve a control valve is arranged, whose time of opening is able to be retarded in response to selected operational parameters of the engine in relation to the time of opening of the inlet valve.

In accordance with a particulary advantageous feature of the invention the control valve has a closing mechanism which is automatically operated in a way dependent on the difference in pressures on the two sides of the control valve, such mechanism being so designed that it responds when the pressure sinks below a given pressure difference.

When the pressure on the engine side has risen to such a degree that equalization of the pressure difference on the upstream and downstream sides of the control valve is about to occur at the directional valve, there is a likelihood of a return of the charge out of the engine cylinder. If the pressure difference is suitable chosen at which the control valve automatically closes, the return flow may be prevented.

A further convenient design is such that the control valve is designed as a directional valve with an adjustable opening threshold.

As soon as the previously set opening threshold is reached, it is possible for the directional valve to open under the influence of the vacuum on the engine side.

In accordance with a particularly convenient feature, the cylinder valve comprises a check flap, adapted to close opposite to the inward flow direction. This means that the time of opening of the control valve is determined by the pressure difference on the two sides of the valve. It would however also be possible to set the time of opening in relation to the crank angle of the engine, as for instance by a catch which be overridden on closing the cylinder valve and able to be moved into the release position in response to the engine crank angle.

In accordance with a further design for producing the unsticking or release force the check flap sealing covers the port of a vacuum duct in the shut position.

This design offers the advantage that the vacuum immediately collapses when the check flap is moved in the opening direction so that the control valve briskly opens without needing any force as soon as the pressure difference at the check flap has exceeded the set opening threshold.

In this respect the vacuum line may comprise a servomember for setting the vacuum. This servormember may be albe to be adjusted in accordance with the operational state of the engine and the position of the accelerator pedal.

In accordance with a further advantageous form of the invention the check flap abuts against a solenoid in the closed setting, the force of the solenoid being able to be adjusted. This setting as well may be varied in response to present parameters during operation.

According to another advantageous design the check flap is biased when it is in the closed position.

Preferably the end of inlet by the inlet valve is set optimum conditions at high speeds of rotation, since the control valve may be used to create favorable conditions for operation at low speeds of rotation.

A working embodiment of the invention will now be described with reference to the drawing.

The drawing diagrammatically shows the inlet and outlet part of a cylinder of a charged IC engine of the piston type with a control valve in accordance with the invention placed upstream from the inlet valve.

A piston 12 is able to move in the combustion chamber 10 of the illustrated engine cylinder. The combustion chamber 10 is supplied with compressed combustion air or a mixture of combustion air and fuel via an inlet duct 14, the combustion chamber 10 being able to be opened and closed by an engine inlet valve 16 operated in response to the crank angle of the engine. The exhaust gases are led off via an outlet duct 18, which is connected via an exhaust valve 20 with the combustion chamber.

Upstream from the inlet valve 16 there is a control valve, generally referenced 22, in the inlet duct 14. Its valve member is in the form of a check flap 26 rotatably carried on the a shaft 24. The check flap 26 is biased by a torsion spring 28 into its closed setting as shown in the figure, the force of the spring being so selected that it pivots the check flap 26 into the closed setting as illustrated as soon as the pressure on the side of the control valve 22 facing the inlet valve 16 has risen to a value near the value of the pressure on the upstream side of the control valve 22.

In the closed setting the check flap 26 rests on an abutment face 30, in which there is the port 32 of a vacuum duct 34. In this respect the arrangement is such that the check flap 26 covers the port 32 in a sealing manner in the closed setting of the valve. The control valve 22 will thus only open when the pressure upstream from the control valve 22 exceeds the pressure downstream from the control valve 22 by such an amount that the pressure difference is able to overcome the closing force exerted by the vacuum in the vacuum duct 34 and the torsion spring 28. As soon as this state has been reached and the check flap 26 has only moved a small distance in the opening direction, the vacuum collapses and the check flap is able to pivot into the open setting against the small resistance of the torsion spring 28.

In order to set the unsticking or release force stetting valve 36 is arranged in the vacuum duct 34 which may be permanently set to the desired unsticking force or, preferably, is arranged to vary its function in accordance with the operational state of the engine and the position of the accelerator pedal.

The vacuum duct 34 with its port 32 is only one of various possible arrangements for applying retaining force which is to be overcome by the unsticking or release force. It would thus be possbile for instance to replace the vacuum system by a solenoid which would be arranged in the vicinity of the abutment face 30 in place of the port 32.

Since the control valve 22 always closes the inlet duct 14 automatically at the desired point in time, it is possible for the end of inlet of the engine valve 16 to be set to optimum conditions at high speeds of rotation, in which respect the control valve 22 will then automatically assume

I claim:

1. A method for operating a piston type internal combustion engine comprised of an inlet duct leading to at least one piston chamber of the engine, a super charge coupled with the inlet duct; at least one inlet valve placed between the inlet duct and each combustion chamber, and a control valve positioned upstream from the inlet valve in the inlet duct between the inlet valve and the super charge, said method comprising:

forming a negative pressure in the inlet duct between the inlet valve and the control valve;

forming a precompressed positive pressure by said super charger in the inlet duct between the super charger and the control valve;

maintaining said control valve in a closed position independent of the position of said inlet valve by an adjustable auxiliary force until the positive pressure of said super charger overcomes said auxiliary force;

opening said control valve independent of said inlet valve enabling said precompressed positive pressure to enter into said negative pressure inlet duct portion such that said control valve opening is enabled to be freely delayed with respect to opening of said inlet valve, opening of said control valve being in response to selected operational parameters of the engine.

2. An internal combustion engine with one or more combustion chambers for enabling charged positive pressure to pass into said one or more combustion chambers comprising:

at least one combustion chamber in said engine;

an inlet duct coupled with said at least one combustion chamber;

a super charger for providing a precompressed positive charge of combustion air coupled with said inlet duct;

at least one inlet valve placed between said inlet duct and each combustion chamber;

a control valve positioned in said inlet duct between said inlet valve and said charger; and means for controlling opening of said control valve, said control means opening said control valve independently of said inlet valve such that opening time of said control valve is able to be freely adjusted with respect to opening time of said inlet valve, opening of said control valve being in response to selected operational parameters of the engine.

3. The mehtod as claimed in claim 1, characterized in that the control valve is automatically shut as soon as the pressures upstream and downstream of the control valve have decreased to a value under a preset pressure difference.

4. The IC engine as claimed in claim 2, characterized in that the control valve (22) comprises a closing mechanism (24, 26, 28 and 30) able to be automatically controlled in response to differences in pressure on sides of the control valve (22), such mechanism being so designed that it responds when the pressure difference is compensated.

5. The IC engine as claimed in claim 4, characterized in that the control valve (22) is a directional valve with an adjustable opening threshold.

6. The IC engines as claimed in claim 4, characterized in that the control valve (22) has a check flap (26) designed to close against inflow direction combustion air and having an adjustable unsticking force.

7. The IC engine as claimed in claim 6, characterized in that the check flap is provided with a catch which is able to be overcome on closing and is able to be transferred into a released state in accordance with a predetermined engine crank shaft angle.

8. The IC engine as claimed in claim 6, characterized in that the check flap (26) sealingly shuts off an opening (32) of a vacuum duct (34) in a closed state.

9. The IC engine as claimed in claim 8, characterized in that the vacuum duct (34) comprises a servomember (36) for adjustment of vacuum.

10. The IC engine as claimed in claim 6, characterized in that the check flap (26) abuts a solenoid in a closed setting.

11. The IC engine as claimed as claim 10, characterized in that solenoid force is adjustable.

12. The IC engine as claimed in claim 9, characterized in that the servomenber (36) is able to be adjusted in response to operational conditions of the engine and position of an accelerator pedal.

13. The IC engine as claimed in claim 6, characterized in that closing of the engine inlet valve (16) is set to optimum conditions at high speeds of rotation.

* * * * *

UNITED STATES PATENT AND TRADEMARK OFFICE
CERTIFICATE OF CORRECTION

PATENT NO. : 5,038,734 (Page 1 of 2)
DATED : August 13, 1991
INVENTOR(S) : Oskar Schatz It is certified that error appears in the above-identified patent and that said Letters Patent is hereby corrected as shown below:

ON THE TITLE PAGE, "Foreign Application Priority Data", insert --Nov. 6, 1987 [DE] Fed. Rep. of Germany P3737827.9--.

Column 2, line 24, "particulary" should be --particularly--.

Column 2, line 52, after "which", insert --would--.

Column 2, line 66, "albe" should be --able--.

Column 3, line 5, "present" should be --preset--.

Column 3, line 8, after "set", insert --to--.

Column 3, line 56, "stetting" should be --setting--.

Column 4, line 6, after "assume", insert --the function of improving the torque at lower speeds of rotation.--

Column 4, line 10, claim 1, "charge" should be --charger--.

Column 4, line 15, claim 1, "charge" should be --charger--.

Column 4, line 57, claim 3, "mehtod" should be --method--.

Column 5, line 4, claim 6, "engines" should be --engine--.

Column 6, line 7, claim 11, "as" (second occurrence) should be --in--.

UNITED STATES PATENT AND TRADEMARK OFFICE
CERTIFICATE OF CORRECTION

PATENT NO. : 5,038,734
DATED : August 13, 1991
INVENTOR(S) : Oskar Schatz

It is certified that error appears in the above-identified patent and that said Letters Patent is hereby corrected as shown below:

Column 6, line 10, claim 12, "servomenber" should be --servomember--.

Signed and Sealed this

Fourth Day of May, 1993

Attest:

MICHAEL K. KIRK

Attesting Officer

Acting Commissioner of Patents and Trademarks